Aug. 23, 1966  F. FURRER  3,267,983
APPARATUS TO PULL TYRES OUT FROM THE RIMS OF VEHICLES WHEELS
Filed Oct. 12, 1964  2 Sheets-Sheet 2
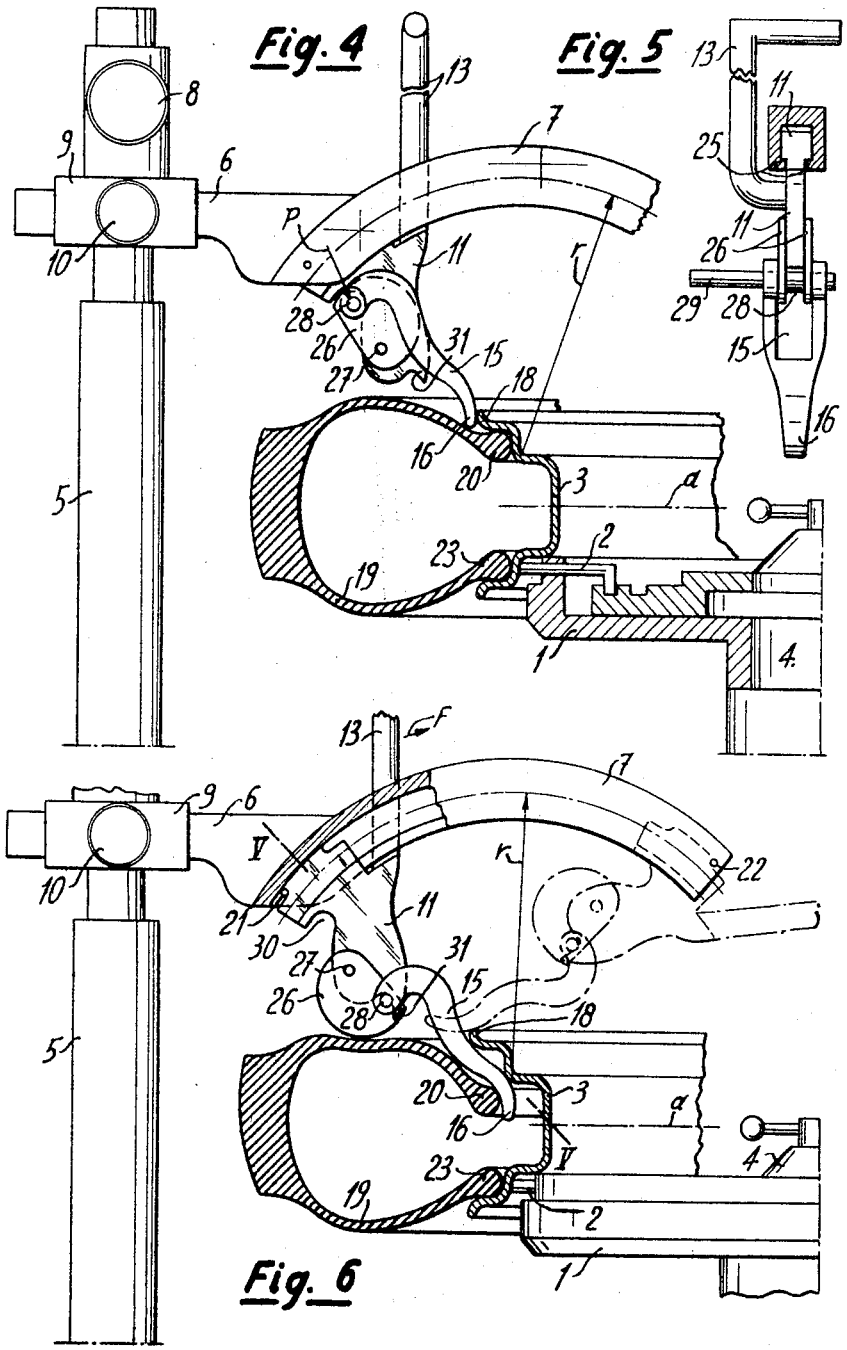
INVENTOR
FERDINAND FURRER
By Lane, Aitken, Dunner & Ziems
ATTORNEYS United States Patent Office 3,267,983
Patented August 23, 1966

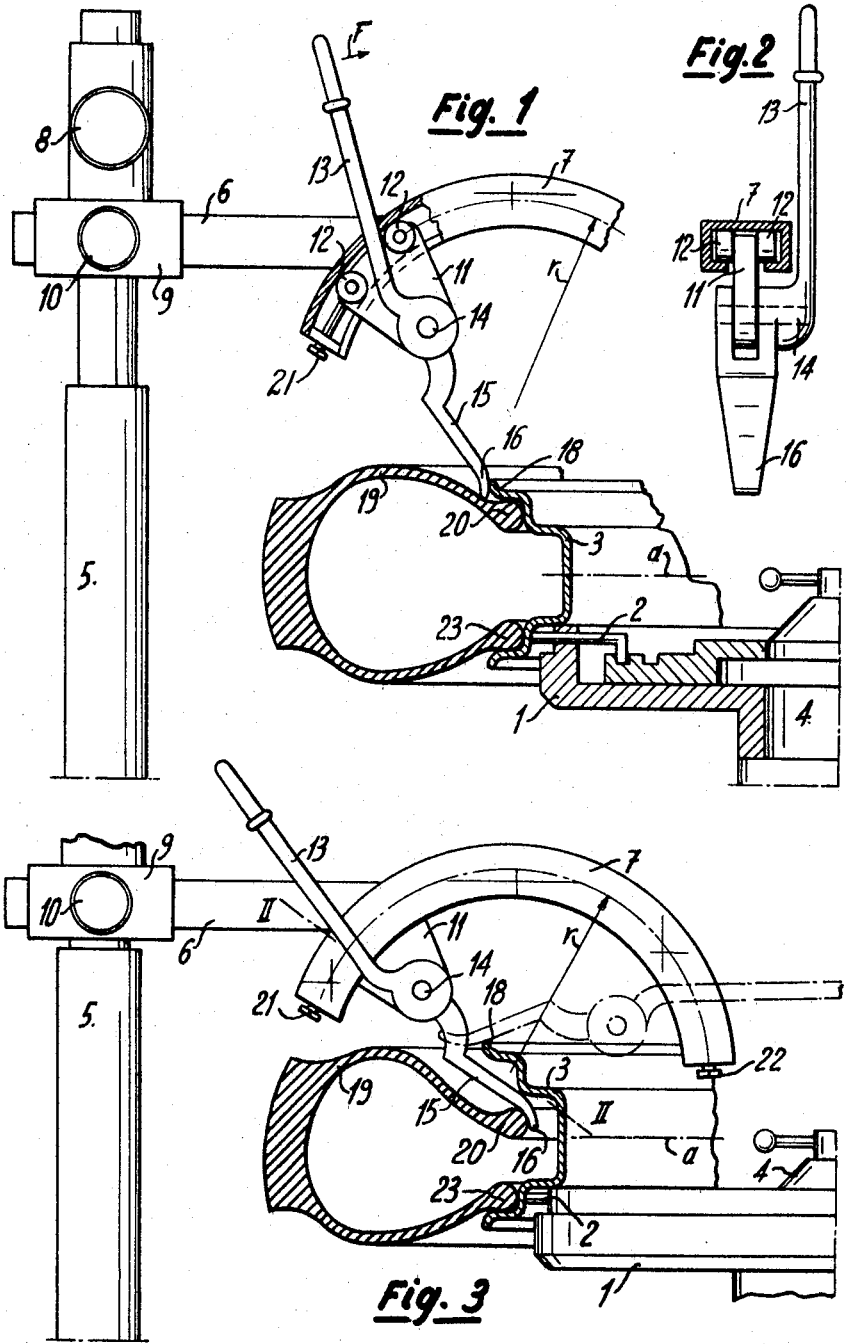

3,267,983
APPARATUS TO PULL TYRES OUT FROM THE RIMS OF VEHICLE WHEELS
Ferdinand Furrer, Zurich, Switzerland, assignor to Julio Villars, Geneva, Switzerland
Filed Oct. 12, 1964, Ser. No. 403,057
Claims priority, application Switzerland, Oct. 15, 1963, 12,730/63
7 Claims. (Cl. 157—1.24)

The present invention has for its object the provision of an apparatus to pull the tyres out from the rims of vehicle wheels comprising a device for maintaining or holding the rim which is characterized in that it comprises a support carrying a device for the pulling out of the tyre from the rim comprising a slide sliding along arcuated guiding means disposed in a radial plane, a pulling out tool hinged with respect to said slide and an operating lever enabling the displacement of the slide along said guiding means. The device is further characterized in that adjusting means are provided to modify the vertical and radial position of said guiding means for adjusting its position according to the width and the diameter of the rim; in that in the position of the beginning of operation, the pulling out tool is deeply introduced between the rim and the tyre so that its free extremity is located approximately in the half-way plane of the rim whereas after actuation of the operating lever, the free extremity of this pulling out tool is located approximately in a plane defined by the edge of the rim and extends radially beyond said edge to a distance sufficient to support the reinforced edge of the tyre only but not sufficient to clamp the inner tube; and in that the device for maintaining or holding the rim and the support are displaceable with respect to each other in a circular movement centered on the axis of the wheel in order to pull the reinforced edge of the tyre out of the rim along the whole periphery of said rim.

The attached drawing illustrates schematically and by way of example two embodiments of the apparatus.

FIG. 1 is a partial side view, some parts being seen in cross-section, of the first embodiment.

FIG. 2 is a partial cross-section along line II—II of FIG. 3.

FIG. 3 is a view similar to the one of FIG. 1, the separating tool being however shown in two different positions.

FIG. 4 is a partial side view, some parts being seen in cross-section, of the second embodiment, with the separating tool being shown in a position before entering between the rim and the reinforced edge of the tyre.

FIG. 5 is a partial cross-section view along line V—V of FIG. 6.

FIG. 6 is a view similar to the one of FIG. 4, the separating tool being however shown in two different positions.

According to FIGS. 1 to 3 of the attached drawing, the pulling out apparatus comprises a table 1 provided with a maintaining or holding device constituted by three dogs 2, only one of which is shown. These dogs 2 are intended to grasp the rim 3 at its internal face. The dogs may be individually actuated, but are preferably actuated simultaneously by any known mechanical or pneumatical device provoking a simultaneous and symmetrical outward displacement of the three dogs so that the rim grasped by said dogs is centered with respect to a shaft 4 of the table 1. Thus this shaft is located in the geometric axis of the rim.

The device further comprises a support 5 formed by a column rigidly fixed with respect to the shaft 4 of the table 1. This column carries an arm 6 disposed in a vertical radial plane of the table 1, the end of which carries arcuated guiding means 7. A screw 8 permits vertical adjustment of the position of the arm 6 along the column 5, whereas the length of the arm 6 is adjusted by sliding the arm inside a sleeve 9. The length of the arm 6 is fixed after adjustment by means of a screw 10.

Thus the vertical and radial position of the arcuated guiding means 7 is adjustable as a function of the diameter of the wheel and of the width of the rim of said wheel.

A slide 11 provided with rollers 12 is held in the guiding means 7, the rollers rolling along these guiding means as shown in FIGS. 1 and 2.

An operating lever 13 is hinged on pin 14 of the slide 11 and carries, rigidly fixed on it, a pulling out tool 15, the free end 16 of which is slightly curved in the shape of a spoon.

When the operator wants to pull a tyre out of its rim, he first proceeds to loosen the tyre from said rim by means of any known device but preferably by means of the device described in my copending patent application Serial No. 361,058 filed April 20, 1964, entitled "Device for Loosening a Vehicle Tyre From Its Rim."

To loosen the tyre from the rim of the wheel, the rim is first placed on the table 1, and the dogs 2 are actuated to fasten said rim 3 on the table. The operator places the slide 11 by means of the operating lever 13, at the end of the guiding means located near the column 5 (FIG. 1) so that this slide bears on an abutment 21. The operator then adjusts the radial position of the guiding means 7 and lowers the arm 6 to bring the end 16 of the pulling out tool 15 in the position shown in FIG. 1, wherein this tool abuts against the edge 18 of the rim 3 and bears on the tyre 19. It is to be noted that when the tool 15 is in the position shown in FIG. 1, the arcuated guiding means, which in the example shown is arcuated along an arc of circle r, takes a position for which its end, carrying the abutment 21, is nearer to the edge 18 of the rim than its end bearing the abutment 22.

After this adjustment of the radial position of the guiding means with respect to the rim 3 is effected, the operator then lowers the arm 6 along the column 5 to insert the pulling out tool 15 inside the rim 3 thereby introducing its end 16 between the reinforced edge 20 of the tyre 19 and the rim 3 to the position shown in full lines in FIG. 3. End 16 is located approximately in the half-way plan $a$ of the rim.

The operator pulls in the direction F on the operating lever 13 so that the slide 11 slides along the arcuated guiding means 7 from the position shown in full lines in FIG. 3 to the position shown in dashed lines, located at the opposite end of guiding means 7 where the slide 11 bears against the abutment 22.

For that position of the slide 11, the pulling out tool is located in the position shown in dashed lines in FIG. 3. End 16 of the tool is located approximately in the plane defined by the edge 18 of the rim 3 so that the reinforced edge 20 of the tyre which is held by the pulling out tool, is located outside the rim.

It is to be noted that during the displacement of the slide 11 along the guiding means 7, the pulling out tool bears on the edge 18 of the rim and pivots around it. Due to the fact that the end of the guiding means carrying the abutment 22 is further away from said edge 18 than its end carrying the abutment 21, this pulling out tool is progressively withdrawn from the rim, sliding on this edge 18 of the rim. When the slide 11 bears on the abutment 22, the pulling out tool extends beyond the edge 18 to a length sufficient to carry the reinforced edge 20. In that way the end 16 of the pulling out tool escapes the inner tube (not shown). This inner tube cannot therefore be clamped between the end 16 of the pulling out tool and the edge or flange 20.

To pull the reinforced edge 20 out of the rim on its whole periphery, the column 5 is displaced with respect to the rim 3 in a circular movement centered on the axis of the wheel. In fact during such a displacement, the pulling out tool which is maintained in the position shown in dashed lines in FIG. 3, slides along the edge 18 of the rim and pulls out the reinforced edge 20.

To pull out the reinforced edge 23 of the other side of the tyre, the slide 11 is brought against the abutment 21, and the tyre is lifted with its edge 23 being brought in front of the end 16 of the pulling out tool. The operating lever 13 is then displaced in the direction F to bring the slide 11 against the abutment 22. Finally, the rim is pivoted around the axis of shaft 4 of the table as above described. The tyre is then completely pulled out or separated from the rim.

The relative circular displacement between the column 5 and the table 1 may be manually effected by actuating the rim or obtained by means of a motor driving the table 1 in a movement of rotation around its axis of shaft 4.

Practical tests have shown that the described apparatus enables an easy and rapid work.

In the embodiment shown in FIGS. 4 to 6, the elements equivalent to the ones already described with reference to FIGS. 1 to 3 bear the same reference numerals.

In this embodiment the guiding means 7 is arcuated along an arc of circle having a radius r the center of which is located inside the wheel when said guiding member is in its radial and vertical working position as shown in FIG. 6.

The slide 11 does not carry any roller but instead two lateral shoulders 25, are inserted in the arcuated guiding means. This slide 11 carries the operating lever 13. The pulling out tool 15 is mechanically connected to the slide 11 by means of a pair of links 26 hinged on pin 27 of the slide 11. This pulling out tool 15 is freely hinged on pin 28 of said links. A handle 29 enables the links 26 to be positioned in either the retracted position of the pulling out tool shown in FIG. 4, and defined by the axis of the hinge 28 abutting against the bottom of a housing 30 of the slide 11, or in a working position shown in full lines in FIG. 6, and defined by the axis of the hinge 28 abutting on a member 31 of the slide 11.

After having placed the rim 3 on the table 1 and fixed the position of the guiding means including the height along the column by means of the screw 8 and the radial position by means of screws 10 so that the links 26 are in a position corresponding to the retracted position of the tool 15 (FIG. 4), the end 16 of this tool abuts on the edge 18 of the rim and bears on the tyre 19. The operator then pulls on the handle 29 in the direction P so that the links 26 move from the position shown in FIG. 4 into the position shown in full lines in FIG. 6. During this displacement of the links 26, the tool 15 slides along the edge 18 of the rim and its end is deeply introduced inside the rim between said rim and the reinforced edge of the tyre. When the axis of the hinge 28 rests on the member 31 the end 16 of the pulling out tool is located approximately in the half-way plane of the rim 3.

By then pulling on the operating lever 13 in the direction F the operator displaces the slide 11 along the guiding means from its position defined by the abutment 21 (FIG. 6) until its position defined by the abutment 22 shown in dashed lines in FIG. 6.

During this displacement of the slide along the arcuated guiding means, the pulling out tool resting on the edge 18 pivots around, and slides on this edge as described with reference to FIGS. 1 to 3.

Therefore the pulling out tool takes the position shown in dashed lines in FIG. 6 in which its end 16 is located approximately in the plane defined by the edge 18 of the rim 3, and extends radially beyond said edge 18 to a short length sufficient to hold the reinforced edge 20 of the tyre, but not sufficient to retain or clamp the inner tube between said end 16 and this reinforced edge 20. To finish the pulling out of the reinforced edge 20, the operator maintains the slide 11 against the abutment 22 and provokes a relative circular displacement, centered on the axis of shaft 4 of the table 1, between the rim 3 and the support 5.

This second embodiment is in fact very similar to the first one described. However, the entering of the end of the pulling out tool between the reinforced edge 20 of the tyre and the rim 3 is easier. Further the shape of the pulling out tool as shown permits a greater reduction of the length of the arcuated guiding means 7 in order to obtain a handier apparatus.

I claim:

1. Apparatus for pulling out a tyre from the rim of a vehicle wheel comprising means for supporting said rim; support means; tyre loosening means adjustably mounted on said support means, said loosening means comprising arcuate guide means, a slide mounted for movement on said guide means, a tyre engaging tool mounted on said slide, and means operatively connected to said slide for initially positioning said tool between the tyre and rim so that said tool extends to a point approximately midway between the outer edges of said rim and after movement of said slide on said guide means said tool is positioned approximately in a plane defined by an outer edge of said rim; means for adjusting the position of said tyre loosening means in relation to said rim supporting means; and means for moving said tyre loosening means and said rim supporting means relative to one another in a circular path having an axis coincident with the center axis of said rim, whereby upon relative movement between said tyre loosening means and said rim, said tool pulls out an edge of the tyre along the periphery of said rim.

2. An apparatus as defined in claim 1 wherein said tool is mounted on said slide through a pivotal connecting member whereby the tool may be displaced between two positions determined by abutments provided on said slide, one of said positions corresponding to a retracted position and the other of said positions corresponding to a working position of the tool.

3. An apparatus as defined in claim 1 wherein the arcuate guide means is arcuated along an arc of a circle.

4. An apparatus as defined in claim 1 wherein said tyre engaging tool is of such a length that the free end thereof extends radially beyond the outer edge of said rim after movement of said slide on said guide means to a distance sufficient to support the reinforced edge of the tyre but not sufficient to clamp the inner tube of said tyre.

5. An apparatus as defined in claim 1 wherein said guide means is in a plane radially disposed to the axis of the vehicle wheel rim.

6. An apparatus as defined in claim 1 wherein said tool is pivoted on the slide and said positioning means is mounted on said slide.

7. An apparatus as defined in claim 1 wherein said positioning means is carried by the slide.

No references cited.

GRANVILLE Y. CUSTER, JR., *Primary Examiner.*